United States Patent
Catena et al.

Patent Number: 5,466,734
Date of Patent: Nov. 14, 1995

[54] AQUEOUS COLD SEAL RELEASE LACQUER

[75] Inventors: Robert J. Catena, Belleville; Prasad K. Adhikari, Carlstadt, both of N.J.

[73] Assignee: Sun Chemical Corporoation, Fort Lee, N.J.

[21] Appl. No.: 305,224

[22] Filed: Sep. 13, 1994

[51] Int. Cl.$^6$ .................................................. C08K 5/20
[52] U.S. Cl. ..................... 524/230; 524/428; 524/538; 524/597; 524/598
[58] Field of Search .................... 524/230, 597, 524/598, 538, 428

[56] References Cited

U.S. PATENT DOCUMENTS

| | | | |
|---|---|---|---|
| 3,994,201 | 11/1976 | Bendler et al. | 89/1.14 |
| 4,810,747 | 3/1989 | Bornack | 524/538 |
| 4,873,311 | 10/1989 | Bornack, Jr. et al. | 528/272 |
| 5,006,863 | 4/1991 | Talvalkar | 346/1.1 |

Primary Examiner—Paul R. Michl
Assistant Examiner—John J. Guarriello
Attorney, Agent, or Firm—Jack Matalon

[57] ABSTRACT

An aqueous cold seal release varnish comprising the reaction product of a mixture comprising 30–50 parts of a polyamide block copolymer having an acid value of 30–45, 1–5 parts of an amide wax, 10–20 parts of at least one $C_1$–$C_4$ alkanol, 5–10 parts of an amine and 15–55 parts of water. The mixture is dissolved by heating at a temperature of 75°–85° C. for a period of time of not more than 90 minutes to produce a varnish. An aqueous cold seal release lacquer (CSRL) is prepared from the varnish by mixing with a $C_1$–$C_4$ alkanol, water and a surfactant.

11 Claims, No Drawings

5,466,734

AQUEOUS COLD SEAL RELEASE LACQUER

FIELD OF THE INVENTION

This invention relates to novel protective lacquers for printed surfaces and to the method for their production. The invention particularly relates to aqueous protective lacquers for printed surfaces used in connection with the manufacturing of packaged products. The invention especially relates to aqueous lacquers used for those packaged products where the printed wrapping for the package is precoated with an adhesive for cold sealing under relatively high speed manufacturing conditions.

BACKGROUND OF THE INVENTION

There are a variety of packaged products, especially foodstuffs, where the packaging film or substrate is printed on one side and an adhesive applied to the opposite side to seal the package. Typically, sealing is achieved using cold seal adhesives, of which the most commonly used adhesives are acrylic based. In order to integrate the packaging and sealing process with the assembly line production of the product the packaging film is manufactured in a large roll with the printed side of the film in contact with the adhesive-coated side of the film. Left unprotected, the pressure exerted on the matching print and adhesive surfaces of the roll during storage or the shearing action of high speed separation of the surfaces during the packaging step of manufacturing results in transfer between the surfaces of ink to adhesive and/or adhesive to ink. To protect against this event, the printing ink surface is coated with a protective lacquer, a cold seal release lacquer (CSRL), that forms a barrier coating between the adhesive and print surfaces of the rolled film.

Cold Seal Release Lacquers (CSRL) were originally developed for the chocolate candy bar market. Cold Seal Technology has now expanded into the snackfood packaging industry. Cold Seal Release Lacquers are generally a polyamide or nitrocellulose/polyamide blend system designed to act as a protective coating for the printed side of a film package. The CSRL must provide gloss and scuff protection to the finished product as well as being block resistant while the printed film is in roll form. High wind-up tension within the printed roll makes the CSRL/Cohesive interface critical. If the CSRL does not provide a smooth, easy unwind, ink picking, film tearing or difficult machining will occur.

Polyamide resins have been found to be uniquely useful in CSRL applications. Besides providing the requisite release, polyamide resins confer high gloss and scuff resistance to the packaged product. Accordingly, they have remained the resin of choice for CSRL applications.

Polyamides are formed by combining carboxylic acids, mostly dibasic, with organic polyamines, usually diamines. The acid and amine groups immediately react to form a salt. Upon heating to 140° C. or higher, this salt decomposes with the evolution of water to give an amide bond.

Alcohol soluble polyamides are widely used in alcohol based flexographic inks for printing on plastic film. Environmental concern over the amounts of volatile organic solvents in the atmosphere has led to a desire to use aqueous solutions that have less volatile organic solvents contained therein. In order to meet new Environmental Protection Agency regulations, it is desirable to employ water based flexographic inks with reduced levels of volatile organic solvents. To accommodate the reduced levels of volatile organic solvents, the polyamide resins used should have increased water solubility and yet retain other desirable properties of polyamide resins. One technological difficulty has been in making water dispersible polyamides which provide inks with properties such as adhesion, gloss, water resistance, and blocking resistance.

One method known in the art to achieve water dispersibility in polyamide resins is to prepare the polyamide having a high acid value (AV). When the free acid groups of the resin are neutralized with ammonia, the resin becomes water soluble. After printing, the ammonia evaporates and the resin develops water resistance.

U.S. Pat. No. 4,810,747 teaches the production of CSRL using an aqueous dispersion of polyamide. However, the polyamide resin is actually a blend of two polyamide resins of different molecular weights to provide a blend with high AV, i.e., low molecular weight, but high hardness, i.e., high molecular weight.

It is an object of the present invention to provide an aqueous cold seal release lacquer having high abrasion resistance, block resistance, and bond strength with low transfer properties and coefficient of friction.

It is a further object of the present invention to provide an aqueous CSRL having the stated properties prepared from a polyamide block copolymer.

SUMMARY OF THE INVENTION

A unique aqueous cold seal release varnish has been prepared which can be formulated into an aqueous CSRL that exhibits release properties superior to those known in the art heretofore. The aqueous varnish comprises a polyamide block copolymer and contains an amide wax dispersed in the aqueous mixture. It has been discovered that the performance of the varnish and the CSRL prepared from the varnish is critically related to the method used for preparing the block copolymer and dispersing the amide wax in the polyamide-containing varnish. The method must be carried out within a relatively narrow envelope of reaction time and temperature in order to obtain superior release properties for the lacquer subsequently prepared.

The invention comprises a method for the production of an aqueous cold seal release varnish comprising preparing a polyamide block copolymer having an acid value of 30–45, a weight average molecular weight of 3000–5000, a number average molecular weight of 2000–4000 and a melting point range of 110°–125° C. Subsequently, 30–50 parts of the polyamide block copolymer are mixed with 1–5 parts of an amide wax, 10–20 parts of at least one $C_1$–$C_4$ alkanol, 5–10 parts of an amine and 15–55 parts of water. The mixture is thereafter heated at a temperature of 75°–85° C. for a period of time of not more than 90 minutes whereby the mixture is dissolved and the varnish is produced.

The polyamide block copolymer is produced by heating a mixture of dimer acid and a $C_2$–$C_{18}$ aliphatic monocarboxylic acid. An equivalent or stoichiometric excess of an aliphatic diamine is added to the mixture and water of condensation is separated. A diacid is added to the mixture after water separation and the mixture is heated until an acid value of 30–45 is produced.

A cold seal release lacquer is prepared from the varnish by mixing the varnish with $C_1$–$C_4$ alkanol, water, surfactant and silicone emulsion additive at a temperature of 20°–80° C. and recovering the lacquer.

DETAILED DESCRIPTION OF THE INVENTION

A distinctive feature of the present invention is the preparation and use of a polyamide block copolymer as the base resin for production of an aqueous varnish and the aqueous cold seal release lacquer produced from the varnish. The polyamide block copolymer resin is heated or reacted with an amide wax in the presence of alcohol and water under a precise set of conditions to produce the aqueous varnish.

Polyamides in general are formed by combining carboxylic acids with organic polyamines. Polyamines employed in the present invention are organic amines having polyamine functionality. Suitable polyamines include aliphatic or cycloaliphatic diamines. Preferred diamines are $C_2$–$C_6$ alkylene diamines including hexamethylene diamine (HMDA), and ethylene diamine (EDA) m-xylene diamine (MXDA), 1,2-diaminocyclohexane (DCH), and isophorone diamine (IPDA).

The carboxylic acids may be either monobasic or dibasic, i.e., monocarboxylic acids or dicarboxylic acids. $C_2$–$C_{18}$ aliphatic monocarboxylic acids are preferred for this invention. Examples of monobasic acids which may be used are propionic acid and acetic acid. Examples of dibasic acids which may be used are dimer acids and aromatic dicarboxylic acids such as isophthalic acid (IPA) and Westvaco Diacid 1550. Westvaco Diacid (WV1550) is the dibasic adduct of acrylic acid and a fatty acid and is essentially 2-n-hexyl-5-(7-carboxyl-n-heptyl)-cyclohex-3-ene carboxylic acid. The preferred acid is a dimer acid. Dimer acid as used herein is defined as a complex mixture resulting from the polymerization of fatty acids. Representative of these are those that are commercially available from the polymerization of tall oil fatty acids. These have a typical composition consisting of 0–5 weight percent $C_{18}$ monobasic acids (monomer), 60–95 weight percent of $C_{36}$ dibasic acids (dimer) and 1–35 weight percent of $C_{54}$ and higher polybasic acids (trimer). The relative ratios of monomer, dimer and trimer are dependent on the nature of the starting material and the conditions of polymerization. The preferred compositions for the present invention are those that comprise about 82% dimer and 18% trimer and have an acid value of 185–195.

The preferred polyamide block copolymer of the invention is prepared from dimerized fatty acid dimer acid, propionic acid, and ethylene diamine (EDA). Other diacids and diamines may be included. Other polyamines may be used for the polyamide resin as noted above. Typical monobasic acids which may be used are acetic acid and propionic acid.

The polyamide block copolymer employed in the invention is prepared to have an acid value of 30–45. Acid value as defined in the art is the number of milligrams of potassium hydroxide required to neutralize the free acids present in 1 gram of resin. When neutralized with ammonia, the acid groups in the resin impart water solubility. After printing, the ammonia evaporates and the resin develops water resistance. High acid value is achieved in the resin by using an excess of carboxylic acid in the polymerization reaction.

The preferred polyamide block copolymer has a weight average molecular weight of 3000–5000, a number average molecular weight of 2000–4000 and a melting point of 110°–125° C.

The novel aqueous varnish of the invention includes, principally, the polyamide block copolymer and an amide wax. The varnish is prepared by mixing the polyamide and the amide wax with a lower $C_1$–$C_4$ alkanol, water, and an amine or alkanolamine. The mixture is heated at 75°–85° C. for not more than 90 minutes to produce the varnish. It has been found that the properties of the varnish are particularly sensitive to the temperature and the length of time of reaction. Higher temperatures and longer heating times cause the performance of the varnish to deteriorate and the superior properties of the CSRL to dissipate.

The preferred amide wax useful in the invention to prepare the varnish and lacquer is Ceramid wax. Other waxes which can be used to prepare the wax compound are ARMID HT and KEMAMIDE E. It has been found that the useful waxes have certain properties in common which, it is believed, are important for the preparation of a CSRL with the superior release properties discovered in the lacquer of the invention. The waxes have melting points of 100°–150° C. and particle sizes of 0.1–10 microns.

The amines which are useful in the invention include alkanolamines, ammonium hydroxide, $C_2$–$C_6$ alkyl diamines, diethylamine, triethylamine and isophorone diamine. A preferred alkanolamine is diethylethanolamine.

The aqueous cold seal release lacquer is the end product of the invention and is prepared from the novel polyamide/amide wax described above. The CSRL is prepared by mixing the aqueous varnish with a $C_1$–$C_4$ alkanol, water, a surfactant and a silicone emulsion additive at a temperature of 20°–80° C. and recovering the lacquer. Other additives such as antifoam compounds may be included in the lacquer as known to those skilled in the art. There are a large variety of surfactants which can also be used in the preparation of the lacquer as also known to those skilled in the art, but the preferred surfactant is Aerosol-OT, available from American Cyanamid. Other surfactants include Surfadone LP 300, Surfynol 104H, Surfadone LP 100, Pluronic 25R4, L61, 25R2, Tetronic 70R2, and Iconol WA-1. These additives and their ionic character, their solubility, HLB values, promote the best combination of properties, i.e. dispersibility, printability, gloss, surface energy control, stability, foam control, moisture sensitivity, block resistance and release properties.

The lacquer is produced by mixing 30–60 parts by weight of the varnish, 5–15 parts by weight of the alcohol, 1–5 parts by weight of a surfactant, and 17–64 parts by weight of water.

The following non-limiting Examples are presented to illustrate the preparation of the novel varnish and CSRL of the invention.

EXAMPLE 1

Preparation of Block Copolymer

In a first step, 0.600 equivalent of a dimer acid (83% dimer-17% trimer) and 0.400 equivalents of propionic acid were charged to a 4-neck 1 liter flask equipped with a glass stirrer, thermometer, nitrogen gas inlet adapter, and Dean Stark trap with a reflux condenser. The contents of the flask were agitated and heated to 120° C.

At 120° C., the second segment of the block copolymer was formed by adding 1.550 equivalents of ethylene diamine to the reactor over 1 hour. Once the ethylene diamine was added, the contents were heated slowly to 180° C. At approximately 146° C., water of condensation began to elute over. When the temperature reached 180° C., a Westvaco 1550 Diacid (C-21 diacid) was added to cap off the block copolymer. The mixture was then heated to 200° C. and held for a final acid value of 28–32 and an amine value of 1–4. The melting point was typically in the range of 122°–125° C. (Duran's mercury drop method).

EXAMPLE 2

Preparation of Aqueous Cold Seal Release Varnish

Into a 4-neck 1 liter flask equipped with a glass stirrer, thermometer, nitrogen gas inlet adapter and reflux condenser, 40.00 parts of the block copolymer of Example 1, 2.80 parts of amide wax, 14.20 parts n-propanol, 35.20 parts water, and 7.80 parts diethylethanolamine were charged. The mixture was heated to 80° C. and held until all the contents were solubilized. The reactor was cooled to 60° C. and the product discharged.

EXAMPLE 3

Preparation of Final Aqueous Cold Seal Release Lacquer 40 parts of the aqueous cold seal release varnish of Example 2, 7.00 parts n-propanol and 3.0 parts isobutanol were placed into a "Dispermat". The contents were mixed for approximately 15 minutes at 35°–45° C. To this mixture were added 46.7 parts of water, 2.00 parts of Aerosol-OT surfactant, 1.0 part of silicone emulsion compound, and 0.30 part of antifoam. The mixture was held for an additional 15 minutes in the Dispermat and discharged.

Application of Aqueous Cold Seal Release Lacquer

The sample prints were prepared by applying Sunbond LF, Sunlam H, Multibond or any other N/C polyamide type solvent based ink as well as water-based inks, e.g. Aquaking, Hydropoly, etc. on the Mobil HSTW (printed side treated, adhesive side PVDC coated) polypropylene film. The viscosity of an aqueous cold seal release lacquer was adjusted to 18–20" secs./Zahn cup 3 with an 80:20 (w/w) blend of water and n-propanol. The release coating was then applied with a 200 line/165 line flexo hand proofer. Several 10×25 cm hand roll-outs of ink with lacquer were made. Test specimens were conditioned in a hot air oven for 10–15 secs. at 66°–82° C. The test area was protected from fingerprints, wrinkles, dust, etc. and the test specimens were then separately subjected to the test described. During the block test, the prints were contacted with a second piece of stock which had an aqueous based adhesive applied to them; the adhesives tested were: Findley's 207–939, 207–949.

The procedure for the tests and the criteria for the successful test of the CSRL were as follows:

Lap Rubs

Print fold face to face and rubbed between fingers.

The lap rub test is a quick check at press-side before running the actual C.O.F. Generally, the print specimens are folded face-to-face and rubbed between fingers; there should be no adhesion or cohesion between adjacent surfaces and they should slide freely upon one another. Rating 0–10, 10 being the best, i.e. no friction.

P=Poor (fail)

M=Moderate (fail)

G=Good (Pass)

Coefficient of Friction C.O.F

Coefficient of friction measured on an Instron Tester, print face to clean metal surface or inclined slide angle tester.

The C.O F.'s of the lacquer to lacquer, and lacquer to metal are important factors for processing packaging materials. If the C.O.F. is too high, movement of the packaging material over fixed elements will become difficult, possibly causing a problem in control of web tension. Alternatively, if the coefficient of friction is too low, then guiding rollers on the packaging line will not rotate, resulting in irregular flow with finished packages tending to slip during transportation.

The C.O.F. was measured using the tilting plane slide angle tester, where a print specimen is fastened face upwards to the plane and a metal sled is placed on the specimen. The plane is slowly raised until the sled slowly and evenly moves down the plane and the tangent of the angle of inclination is equal to the static C.O.F. Alternatively, the static C.O.F. between two printed surfaces is measured by attaching a print to the metal sled and repeating the test as above. C.O.F. obtained with aqueous C.S.R.L., lacquer to lacquer 0.2 (average) and lacquer to metal 0.2 (average). Though the C.O.F. for this lacquer was tested with inclined slide angle tester, the C.O.F. of the lacquer can also be determined on an Instron Tester. Specification: 0.2–0.4.

Block Resistance at a Humid Condition

Block test condition: 16 hrs at 49° C., 7 kg/m² at 90% relative humidity. Face to adhesive coated side of the stock. Cling to sample print to adhesive-backed stock after block test treatment.

The dry lacquer film weight was 0.45–0.68 kg/ream. A few roll-outs of the prints of the standard solvent based ink and lacquer were made and dried in a hot air oven at 66° C. for 10 sec. Another set of prints were made and dried in a similar fashion. Immediately after drying, the adhesive coated film was laid onto the ink with lacquer coated film face to face. The prints of ink with lacquer in contact with the adhesive were then quickly placed into a spring loaded block tester at 7 kg/m². The block testers were placed overnight, one week, and one month at 43° C. in an 80–90% relative humidity chamber. After the specified time, the block tester was taken from the chamber and the prints removed and allowed to cool. Each print was then slowly and carefully unfolded and visually inspected for blocking (ink transfer or amount of cling compared against a standard solvent based lacquer). This method was previously known as the St. Regis spring loaded block test method.

| | |
|---|---|
| None | 10 |
| Slight | 8 |
| Moderate | 6 |
| Definite | 1 |

Scale{ 1 = Worse  10 = Best

Transfer

Amount of ink removal from sample by adhesive-backed stock when separated from each other by careful unfolding and peeling apart by hand after block test treatment. The adhesive used in this application was styrene-butadiene based. The substrate was a one side treated polypropylene, one side treated polyvinylidene dichloride-coated. The ink and lacquer were placed on the propylene side.

10=Best (no ink removal)

1=Worse (Complete ink transfer to adhesive)

Bond Strength

After the block test, the adhesive of one sample was pressed to the adhesive of a duplicate sample for 1 sec at 5.6 kg/m² at 20° C. using a Sentinel heat sealer. The bond strength is measured by Instron Tester. This test determines the degradation of the adhesive which can reduce sealability.

The results of the foregoing tests on the novel cold seal release lacquer of the invention are presented in Table 1.

TABLE 1

| Success Criteria | Obtained with CSRL |
|---|---|
| Lap Rub, G | G |
| Cling, Slight to moderate | None (10) |
| Bond strength, >21 kg/m² | >21–24.5 kg/m² |
| C.O.F, 0.2–0.4 | 0.2 (within 2 min) |

TABLE 1-continued

| Success Criteria | Obtained with CSRL |
|---|---|
| Transfer, None | None |

EXAMPLE 4

For comparative purposes, a varnish was prepared consisting of the following formula:

| 19.50 parts | n-propanol |
| 54.10 parts | deionized water |
| 1.40 parts | ammonium hydroxide |
| 12.50 parts | Polyamide EA 5803 (Union Camp) |
| 12.50 parts | Polyamide EA 5614 (Union Camp) |

The above varnish when combined with different waxes, wax compounds, and releasing agents did not give satisfactory results for humidity block resistance and release. The two resins used either alone or in any combination did not produce a suitable CSRL.

What is claimed is:

1. A process for the preparation of an aqueous cold seal release varnish comprising the steps of:
   (a) preparing a polyamide block copolymer having an acid value of 30–45, a weight average molecular weight of 3000–5000, a number average molecular weight of 2000–4000 and a melting point range of 110°–125° C.;
   (b) mixing 30–50 parts of the polyamide block copolymer with 1–5 parts of an amide wax, 10–20 parts of at least one $C_1$–$C_4$ alkanol, 5–10 parts of an amine and 15–55 parts of water; and
   (c) heating the mixture at a temperature of 75°–85° C. for a period of time of not more than 90 minutes.

2. The process of claim 1 wherein the mixture contains 40 parts of the polyamide, 2.8 parts of the amide wax, 14.20 of the amine, 7.8 parts of the alkanolamine and 35.2 parts of water and the mixture is dissolved by heating at 80° C.

3. The process of claim 1 wherein the polyamide block copolymer is prepared by the steps of:
   (d) heating a mixture of dimer acid and a $C_2$–$C_{18}$ aliphatic monocarboxylic acid;
   (e) adding to the heated mixture an equivalency excess of an aliphatic diamine and separating water of condensation;
   (f) adding a diacid to the mixture resulting from step (e); and
   (g) heating the mixture resulting from step (f) until the copolymer is produced.

4. The process of claim 1 wherein the amine is selected from the group consisting of alkanolamines, ammonium hydroxide, $C_2$–$C_6$ alkyl diamines, diethylamine, triethylamine and isophorone diamine.

5. The process of claim 1 wherein the amide wax has a melting point range of 100°–150° C. and a particle size of 0.1–10 microns.

6. The process of claim 1 wherein the amide wax comprises ceramid wax.

7. The process of claim 1 wherein the dimer acid comprises a mixture of dimer and trimer acids containing at least 80 wt. % dimer acid and having an acid number of 185–195.

8. A process for the preparation of an aqueous cold seal release lacquer comprising the steps of:
   (h) preparing a polyamide block copolymer having an acid value of 30–45, a weight average molecular weight of 3000–5000, a number average molecular weight of 2000–4000 and a melting point range of 110°–125° C.;
   (i) mixing 30–50 parts of the polyamide block copolymer with 1–5 parts of an amide wax, 10–20 parts of at least one $C_1$–$C_4$ alkanol, 5–10 parts of an amine and 15–55 parts of water; and
   (j) heating the mixture at a temperature of 75°–85° C. for a period of time of not more than 90 minutes to produce an aqueous varnish; and
   (k) mixing the aqueous varnish with a $C_1$–$C_4$ alkanol, water and a surfactant.

9. The process of claim 8 wherein the aqueous varnish is mixed first with the $C_1$–$C_4$ alkanol followed by mixing with the water and surfactant.

10. The process of claim 8 wherein the lacquer also contains a silicone emulsion compound.

11. The process of claim 8 wherein the lacquer is produced by mixing 30–60 parts by weight of the aqueous varnish, 5–15 parts by weight of the $C_1$–$C_4$ alkanol, 1–5 parts by weight of the surfactant, and 17–64 parts by weight of water.

* * * * *